(12) United States Patent
Neumann et al.

(10) Patent No.: US 9,079,573 B2
(45) Date of Patent: Jul. 14, 2015

(54) ASSEMBLY COMPRISING A FLUID RESERVOIR AND A MASTER CYLINDER FOR A MOTOR VEHICLE HYDRAULIC BRAKE SYSTEM

(75) Inventors: Hans-Jürgen Neumann, Rüsselsheim (DE); Peter Tandler, Kronberg/Ts. (DE); Swen Ottmann, Frankfurt (DE); David Sibr, Vrchlabi (CZ); Stepan Vit, Jicin (CZ)

(73) Assignee: Continental Teves AG & Co. oHG (DE)

( * ) Notice: Subject to any disclaimer, the term of this patent is extended or adjusted under 35 U.S.C. 154(b) by 168 days.

(21) Appl. No.: 13/148,759

(22) PCT Filed: Jan. 14, 2010

(86) PCT No.: PCT/EP2010/050367
§ 371 (c)(1),
(2), (4) Date: Aug. 10, 2011

(87) PCT Pub. No.: WO2010/091912
PCT Pub. Date: Aug. 19, 2010

(65) Prior Publication Data
US 2011/0308246 A1 Dec. 22, 2011

(30) Foreign Application Priority Data
Feb. 11, 2009 (DE) .................. 10 2009 000 770
Jan. 12, 2010 (DE) .................. 10 2010 000 813

(51) Int. Cl.
*B60T 8/34* (2006.01)
*B60T 11/26* (2006.01)
*B60T 17/06* (2006.01)

(52) U.S. Cl.
CPC *B60T 11/26* (2013.01); *B60T 17/06* (2013.01)

(58) Field of Classification Search
CPC ......... B60T 11/20; B60T 11/22; B60T 11/26;
B60T 11/16; B60T 11/165; B60T 11/224;
B60T 13/144; B60T 13/565; B60T 13/567;
B60T 13/145; B60T 13/5675; B60T 17/06;
B66F 3/24; B66F 3/42; F15B 7/00; F15B 7/04; F15B 7/08; F16B 21/186
USPC ............. 303/113.1, 48–49; 60/585, 583, 592, 60/578, 547.1
IPC .................................. B60R 16/08; B60T 11/26
See application file for complete search history.

(56) References Cited

U.S. PATENT DOCUMENTS 4,418,534 A * 12/1983 Dufft .............................. 60/585
5,743,092 A * 4/1998 Guenther et al. ............... 60/583
(Continued)

FOREIGN PATENT DOCUMENTS

DE 4423621 A1 * 1/1996
DE 10047325 A1 4/2002
(Continued)

OTHER PUBLICATIONS

International Search Report issued in PCT/EP2010/050367 filed Jan. 14, 2010, mailed May 7, 2010.
(Continued)

*Primary Examiner* — Anna Momper
*Assistant Examiner* — San Aung
(74) *Attorney, Agent, or Firm* — RatnerPrestia

(57) ABSTRACT

An assembly includes a fluid reservoir and a master cylinder for a motor vehicle hydraulic brake system, the fluid reservoir being fastened to the master cylinder by a releasable connection and including at least one connection fitting, which is received in a corresponding connection aperture of the master cylinder. The fluid reservoir includes one or more components, which under a defined force applied to the fluid reservoir, allow a movement of at least one part of the fluid reservoir in the direction of the master cylinder.

13 Claims, 6 Drawing Sheets

(56) References Cited

U.S. PATENT DOCUMENTS

| | | | |
|---|---|---|---|
| 6,571,556 B2* | 6/2003 | Shinohara et al. | 60/585 |
| 7,918,089 B1* | 4/2011 | Wierzchon | 60/585 |
| 2006/0185361 A1* | 8/2006 | Bourlon et al. | 60/585 |
| 2007/0125080 A1* | 6/2007 | Bourlon et al. | 60/585 |
| 2008/0256948 A1* | 10/2008 | Sato | 60/585 |

FOREIGN PATENT DOCUMENTS

| | | |
|---|---|---|
| DE | 10217682 A1 | 11/2003 |
| DE | 10321784 A1 | 12/2004 |
| DE | 10326952 A1 | 5/2005 |
| EP | 1987993 A1 | 11/2008 |
| FR | 2861034 A1 | 4/2005 |
| FR | 2861356 A1 | 4/2005 |
| FR | 2898096 A1 | 9/2007 |

OTHER PUBLICATIONS

German Search Report issued in related Application No. DE 10 2010 000 813.3 dated Oct. 21, 2010 (with partial English translation).

* cited by examiner

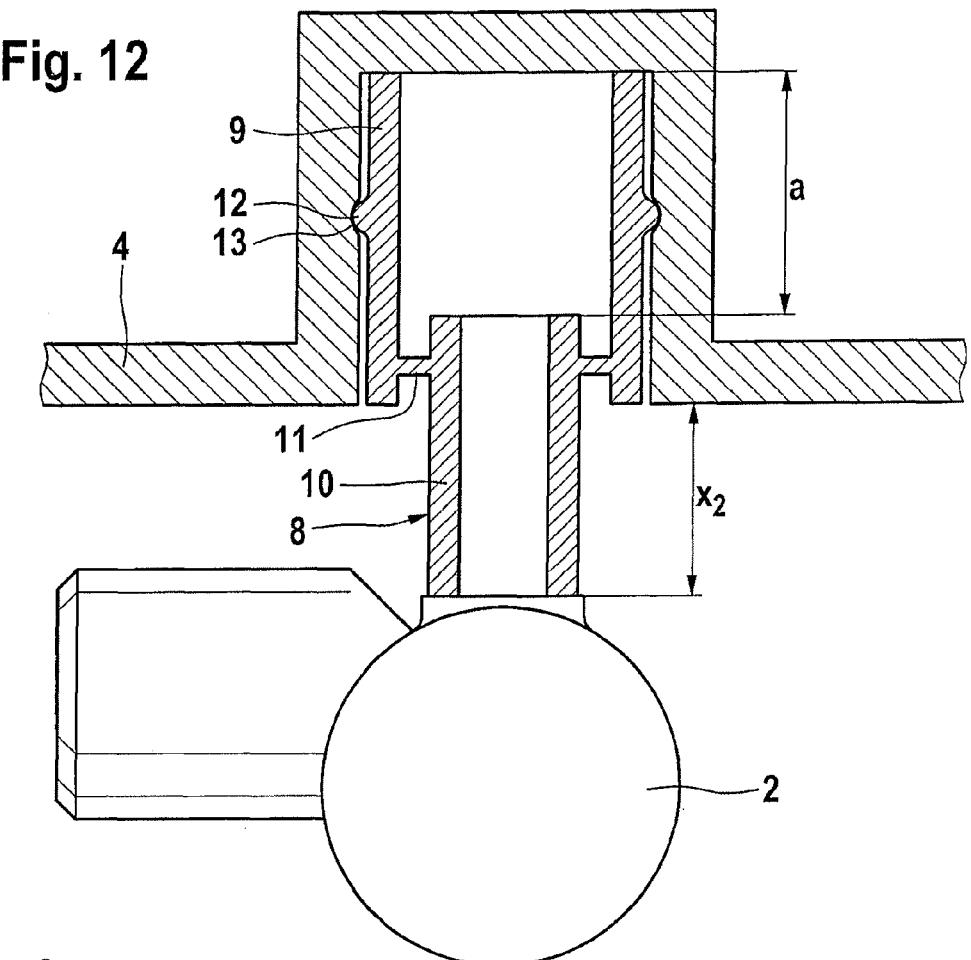
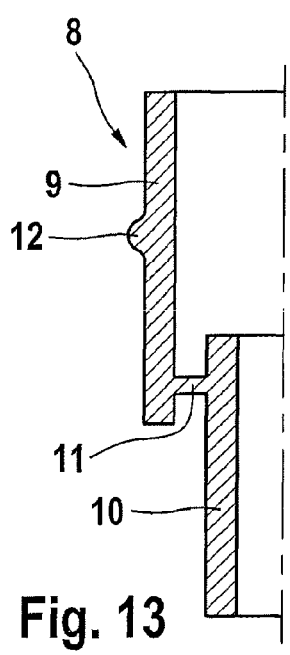
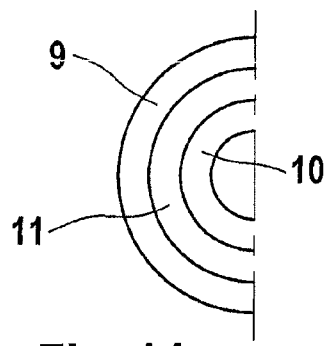
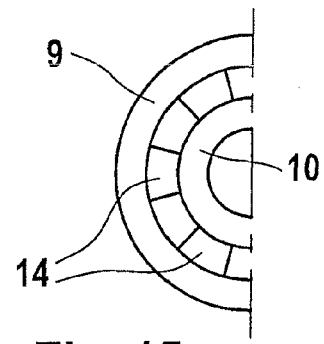
Fig. 12
Fig. 13    Fig. 14    Fig. 15

ASSEMBLY COMPRISING A FLUID RESERVOIR AND A MASTER CYLINDER FOR A MOTOR VEHICLE HYDRAULIC BRAKE SYSTEM

This application is the U.S. National Phase of PCT International Application No. PCT/EP2010/050367, filed Jan. 14, 2010, which claims priority to German Patent Application No. 10 2009 000 770.9, filed Feb. 11, 2009, and German Patent Application No. 10 2010 000 813.3, filed Jan. 12, 2010, the contents of such applications being incorporated by reference herein.

FIELD OF THE INVENTION

The invention relates to an assembly comprising a fluid reservoir and a master cylinder for a motor vehicle hydraulic brake system.

BACKGROUND OF THE INVENTION

Such assemblies are generally known, for example from DE 100 47 325 A1, which is incorporated by reference, and as a rule are arranged just below an engine hood of the motor vehicle. In the fitted state the fluid reservoir of the assembly, in particular, is often situated directly beneath the engine hood.

The state of the art discloses safety devices for motor vehicles, in which, in the event of a vehicle impact with a correspondingly large degree of deformation, a so-called brake unit comprising a brake booster, a master cylinder and a fluid reservoir is pivoted away from the footwell so that the driver will not be injured. Such a safety device is disclosed, for example, by DE 103 26 952 A1, which is incorporated by reference.

The invention is concerned with the protection that a vehicle and its components afford to pedestrians. New provisions require that the front of the vehicle should comprise passive protection for pedestrians. In this context it is essential that the engine hood of the vehicle be capable of absorbing the impact energy of a body. This presupposes, however, that the engine hood is capable of deformation. Owing to the small overall space available in the engine compartment, the assembly comprising a master cylinder and a fluid reservoir cannot be arranged lower down in the engine compartment. Furthermore, the assembly and in particular the fluid reservoir must meet certain stability requirements, thereby making a deformation of the engine hood in the area of the assembly impossible.

SUMMARY OF THE INVENTION

The invention provides an assembly comprising a master cylinder and a fluid reservoir, which will satisfy the requirements relating to the protection of pedestrians.

According to aspects of the invention, the fluid reservoir comprises means, which under a defined force applied to the fluid reservoir allow a movement of at least a part of the fluid reservoir in the direction of the master cylinder. The assembly thereby meets the stability requirements, for example for the pressurized filling of the fluid reservoir with brake fluid, and in excess of a defined force, which is transmitted from the engine hood to the fluid reservoir in the event of an impact, allows a depression of the fluid reservoir, so that a deformation of the engine hood is possible and the impact energy can be absorbed.

According to an advantageous embodiment of the invention the means are provided between a base of the fluid reservoir and the master cylinder. The means can therefore easily be integrated into the assembly without taking up additional overall space.

The means are preferably formed onto the base of the fluid reservoir or are fastened to the base. This serves to ensure that the means will allow a depression of the fluid reservoir only in the event of a sufficiently predefined force.

According to an advantageous embodiment that is easy to produce, at least one web, which is formed onto the base of the fluid reservoir as crash element and which bends out of the way under a defined force applied to the fluid reservoir, is provided as means.

In an alternative advantageous embodiment at least one cylindrical projection, which is formed onto the base of the fluid reservoir as crash element and which bends out of the way under a defined force applied to the fluid reservoir, is provided as means.

According to a further advantageous embodiment that is easy to produce, a pin, which as crash element extends through two straps formed onto the base of the fluid reservoir and which breaks under a defined force applied to the fluid reservoir, may be provided as means.

In order to afford cost-effective manufacturing and ease of assembly, the pin here is made of plastics and comprises a head at a first end and expansion elements at a second end.

In another advantageous embodiment of the invention a cupped crash element, which can be inserted into guide grooves formed onto the base of the fluid reservoir and which bends out of the way under a defined force applied to the fluid reservoir, is provided as means.

An especially easy assembly is achieved in that a cupped crash element, which by means of sprung fastening lugs engages in undercuts formed onto the base of the fluid reservoir and which bends out of the way under a defined force applied to the fluid reservoir, is provided as means.

In order to achieve the predefined force with adequate stability of the cupped crash element, the cupped crash element may be provided from two different materials.

According to a further advantageous development of the invention the means are arranged in an indentation of the base of the fluid reservoir.

For this purpose the means may be provided in the form of two cylindrical sleeves of different diameter, which are connected together by means of one or more connecting webs and under a defined force applied to the fluid reservoir can be telescoped one inside the other through breaking of the connecting webs, the sleeve of larger diameter comprising formed-on projections to hold the sleeves in the indentation.

BRIEF DESCRIPTION OF THE DRAWINGS

Further features, advantages and possible applications of the invention will be apparent from the following description of exemplary embodiments and from reference to the drawing, which shows embodiments. In the drawing each highly schematic figure respectively shows:

FIG. 12 a section through a ninth exemplary embodiment of the assembly according to aspects of the invention;

FIG. 13 a longitudinal section through the crash element of the ninth exemplary embodiment according to FIG. 12;

FIG. 14 the crash element of the ninth exemplary embodiment according to FIG. 12 and FIG. 15 a crash element of a tenth exemplary embodiment.

DETAILED DESCRIPTION OF THE PREFERRED EMBODIMENTS

FIGS. 1 to 15 schematically show exemplary embodiments of an assembly according to aspects of the invention comprising a fluid reservoir 1 and a master cylinder 2 for a motor vehicle hydraulic brake system, the construction and working of which are basically known. Connection fittings (not shown) of the fluid reservoir 1 are received in corresponding connection apertures 3 of the master cylinder 2 after it has been fitted on the master cylinder 2 and connect hydraulic fluid chambers of the fluid reservoir 1 to pressure chambers of the master cylinder 2 in a known manner.

In order to configure the assembly in such a way that it satisfies the requirements with regard to the protection of pedestrians, the fluid reservoir 1 in the exemplary embodiments described below comprises means, which under a defined force applied to the fluid reservoir 1 allow a movement of at least a part of the fluid reservoir 1 in the direction of the master cylinder 2. The assembly thereby meets the stability requirements, for example in the pressurized filling of the fluid reservoir 1 with brake fluid, and in excess of a defined force, which is transmitted from the engine hood to the fluid reservoir 1 in the event of an impact, allows a depression of the fluid reservoir 1 by a predefined distance $x_2$, so that a deformation of the engine hood by a distance $x_1$ is possible and the impact energy can be absorbed.

Since the means described below provided between a base 4 of the fluid reservoir 1 and the master cylinder 2, these can easily be integrated into the assembly without taking up additional overall space.

Figure 1:
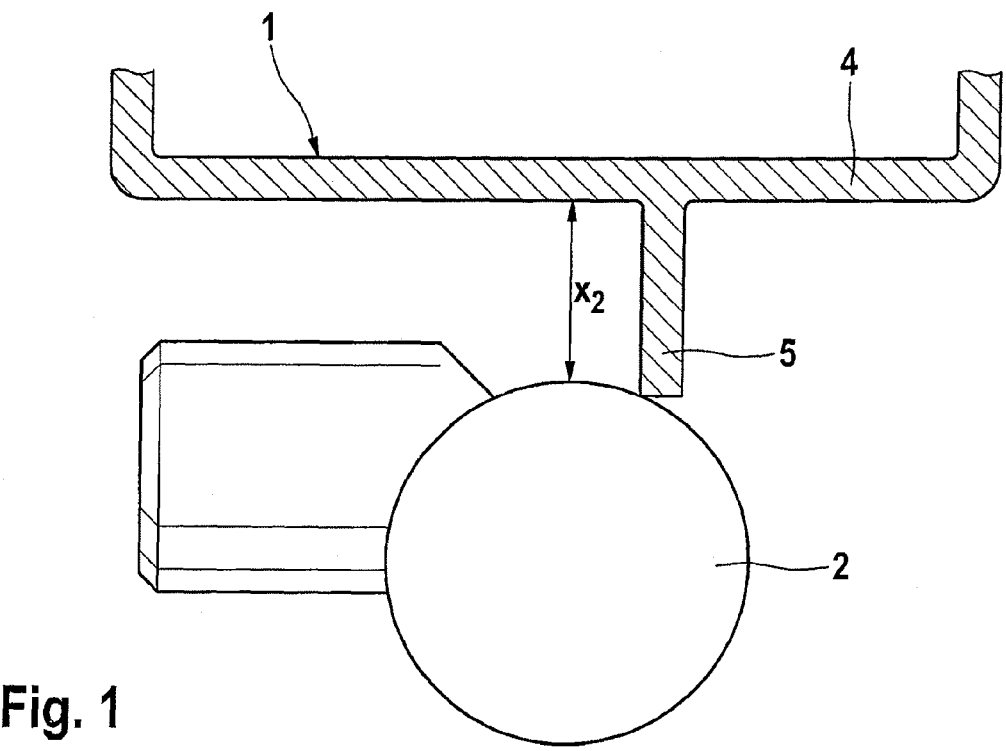
FIG. 1 a section through a first exemplary embodiment of the assembly according to aspects of the invention.

FIG. 1 shows a first exemplary embodiment. As can be seen from this, a web 5 that is easy to produce is formed onto the base 4 of the fluid reservoir 1 as crash element, which bends out of the way under a defined force acting on the fluid reservoir 1, thereby allowing a depression of the fluid reservoir 1.

Figure 2:
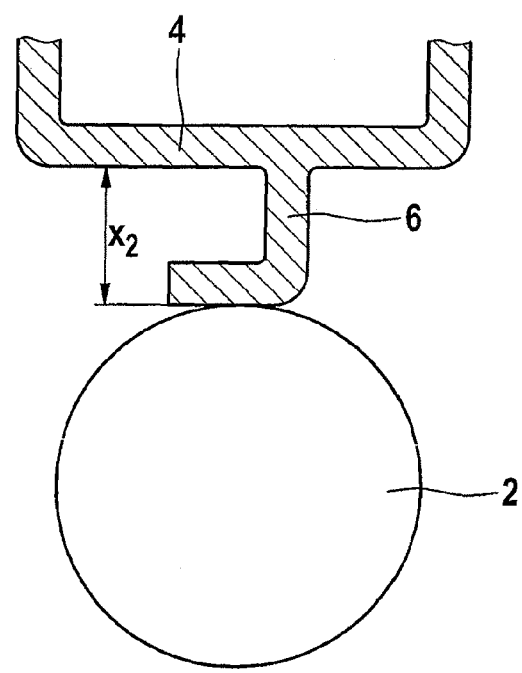
FIG. 2 a section through a second exemplary embodiment of the assembly according aspects of to the invention.

A second exemplary embodiment, which is represented in FIG. 2, shows an L-shaped web 6 as crash element. The L-shape affords improved support for the web 6 on the master cylinder 2.

Figure 3A:
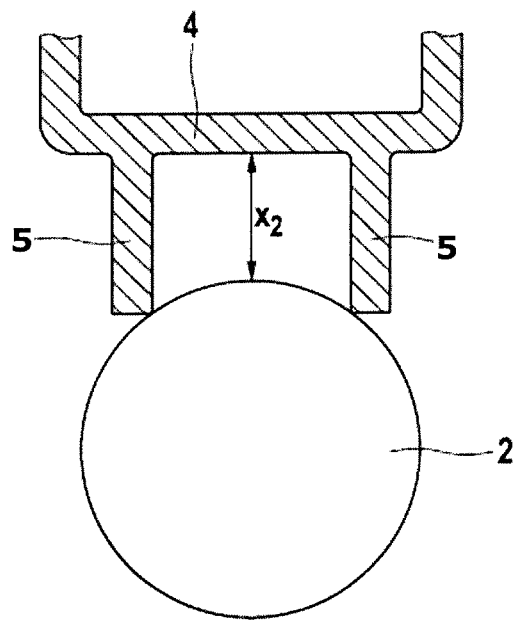
FIGS. 3A and 3B a section through third exemplary embodiments of the assembly according to aspects of the invention.
Figure 3B:
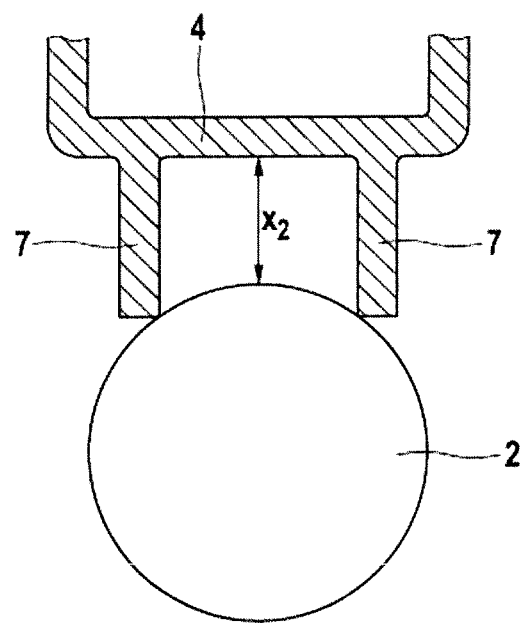

FIG. 3A shows a third exemplary embodiment. The crash element here comprises two webs 5 formed onto the base 4. FIG. 3B shows that it is also possible to provide a cylindrical projection 7 as the crash element.

Figure 4:
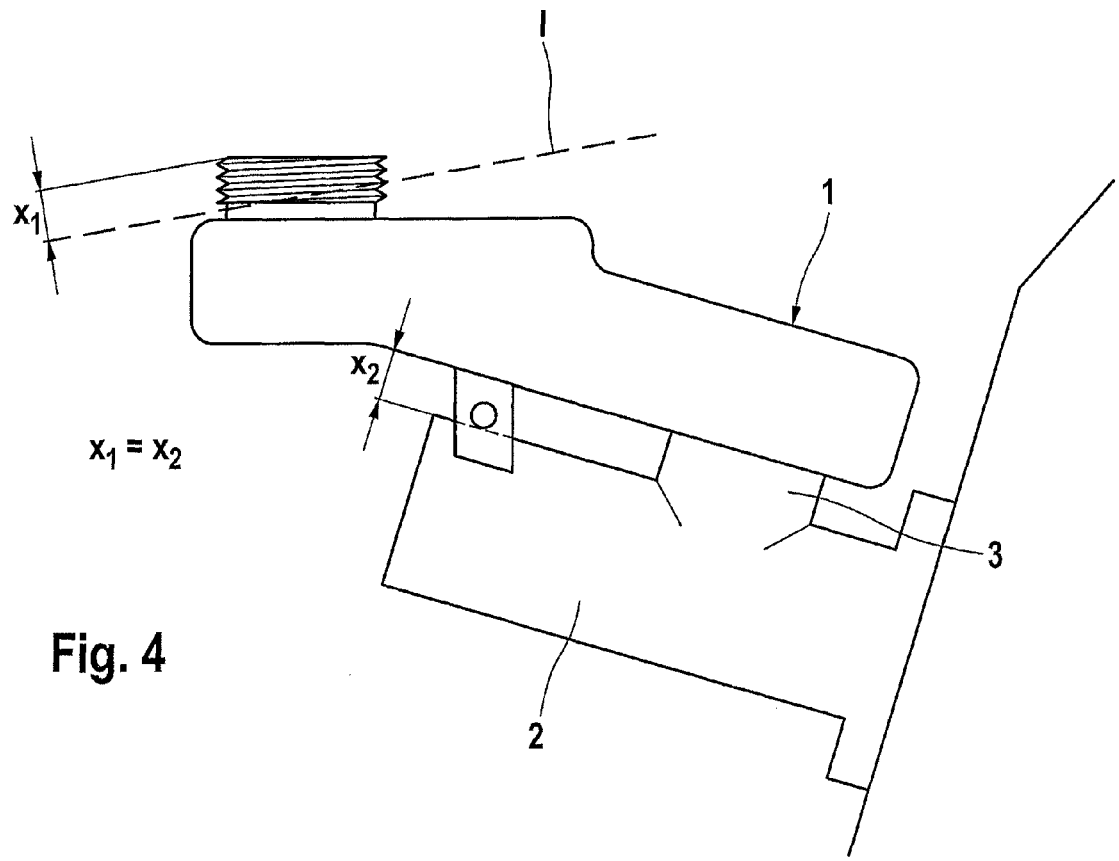
FIG. 4 a fourth exemplary embodiment of the assembly according to aspects of the invention.
Figure 5:
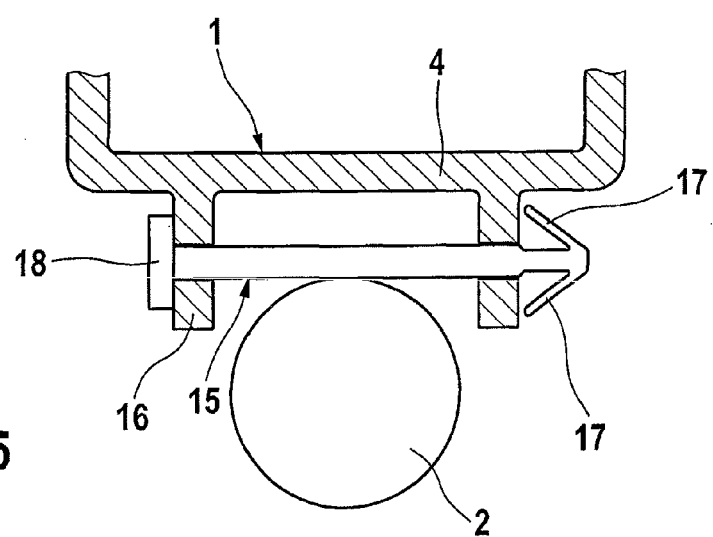
FIG. 5 a section through the assembly according to FIG. 4.

FIGS. 4 and 5 represent a fourth exemplary embodiment, which is likewise easy to produce. As can be seen from FIG. 5 in particular, in this exemplary embodiment a pin 15, which as crash element extends through two straps 16 formed onto the base 4 of the fluid reservoir 1 and which breaks under a defined force applied to the fluid reservoir 1, is provided as means.

The pin 15 can be fitted from both sides and is preferably made from plastics. For captively securing the pin a first end of the pin comprises expansion elements 17 and a second end comprises a head 18. The pin 15 is easy to produce and fit.

It will be clear from FIG. 4 that if the pin 15 breaks the fluid reservoir 1 can be depressed by an amount $x_2$. The dashed line l shows how far the engine hood of the vehicle has to be deformed, in order to allow absorption of the impact energy.

FIGS. 6 to 11 show further exemplary embodiments.

Figure 6:
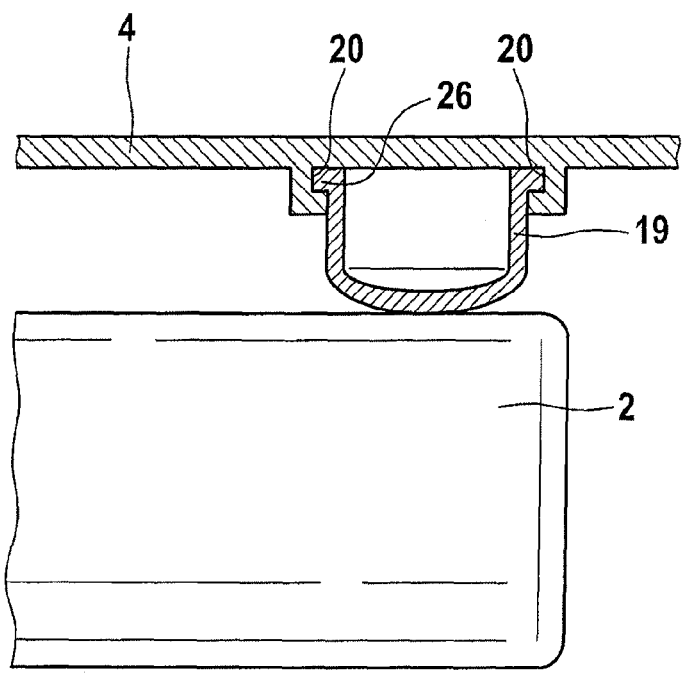
FIG. 6 a fifth exemplary embodiment of the assembly according to aspects of the invention partially in section.
Figure 7:
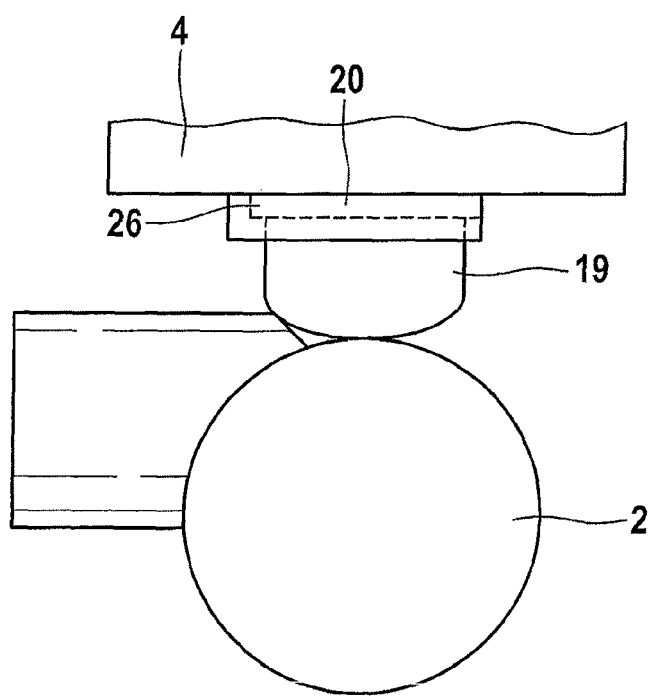
FIG. 7 a further view of the fifth exemplary embodiment according to FIG. 6.
Figure 8:
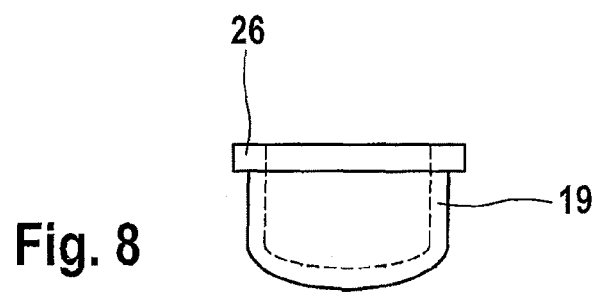
FIG. 8 a section through the crash element of the fifth exemplary embodiment.

Thus FIGS. 6 to 8, for example, show a cupped crash element 19 of a fifth exemplary embodiment, which can be inserted into guide grooves 20 formed onto the base 4 of the fluid reservoir 1 and which bends out of the way under a defined force applied to the fluid reservoir 1. As will be apparent particularly from FIG. 8, which shows the crash element 19, this comprises a circumferential projection 26 for insertion into the guide grooves 20.

Figure 9:
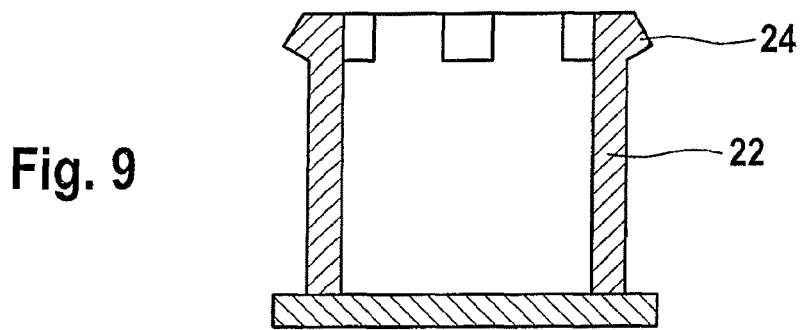
FIG. 9 a section though a crash element of a sixth exemplary embodiment.
Figure 10:
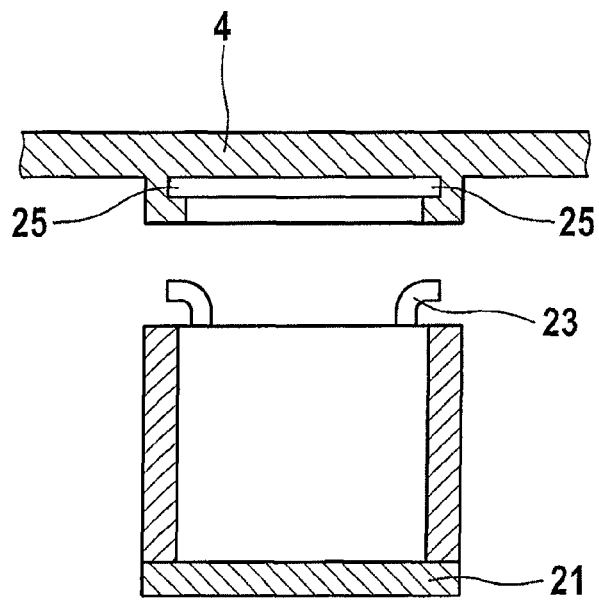
FIG. 10 a section through a crash element of a seventh exemplary embodiment.

Like the preceding exemplary embodiment, FIGS. 9 and 10 show means in the form of cupped crash elements 21, 22, which by means of sprung fastening lugs 23, 24 engage in undercuts 25 formed onto the base 4 of the fluid reservoir 1 and which bend out of the way under a defined force applied to the fluid reservoir 1.

Figure 11:
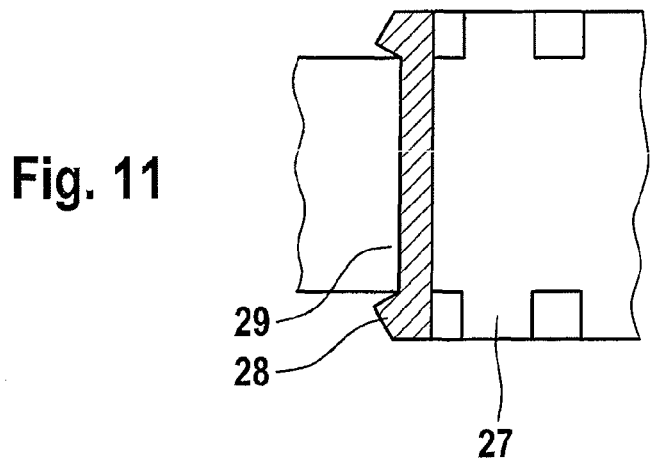
FIG. 11 a section through a crash element of an eighth exemplary embodiment.

FIG. 11 shows an eighth exemplary embodiment. In contrast to the cupped crash elements 21, 22 the cylindrical crash element 27 shown in FIG. 11 comprises inwardly directed sprung fastening elements 28, which grip around a projection 29 formed onto the base 4 of the fluid reservoir 1.

In order to achieve the predefined force with adequate stability, the cupped or cylindrical crash element 19, 21, 22, 27 may be provided from different materials.

A ninth exemplary embodiment is represented in FIGS. 12 to 14. It shows a crash element 8, which comprises two cylindrical sleeves 9, 10 of different diameter. The two sleeves 9, 10 are connected by means of a circumferential connecting web 11. The sleeve 9 is located by means of projections 12, formed on the outside thereof, in an indentation 13 of the base 4 and is held therein. With its end the smaller sleeve 10 bears against the master cylinder 2. Under a defined force acting on the fluid reservoir 1 the connecting web 11 breaks and the sleeves 9, 10 can be telescoped one inside the other by the distance a, that is to say the small sleeve 10 can subside into the larger sleeve 9 and the fluid reservoir 1 can be depressed by the distance $x_2$. The distance a is advantageously greater than the distance $x_2$.

FIG. 7 shows a crash element 9 of a tenth exemplary embodiment, which basically corresponds to the exemplary embodiment according to FIGS. 12 to 14. In contrast to these, multiple individual connecting webs 14 are provided for connecting the two sleeves 9, 10.

LIST OF REFERENCE NUMERALS 1 fluid reservoir
2 master cylinder
3 connection aperture
4 base
5 web
6 web
7 web 8 crash element
9 sleeve
10 sleeve
11 connecting web
12 projection
13 indentation
14 connecting web
15 pin
16 strap
17 expansion element
18 head
19 crash element
20 guide groove
21 crash element
22 crash element
23 fastening lug
24 fastening lug
25 undercut
26 projection
27 crash element
28 fastening element
29 projection
a distance
l line
$x_1$ distance
$x_2$ distance

The invention claimed is:

1. An assembly comprising:
a fluid reservoir and a master cylinder for a motor vehicle hydraulic brake system,
wherein the fluid reservoir is configured to be fastened to the master cylinder by a releasable connection and comprising at least one connection fitting, which is received in a corresponding connection aperture of the master cylinder,
wherein the fluid reservoir comprises means including at least one crash element integral with the fluid reservoir that allows a movement of at least one part of the fluid reservoir in the direction of the master cylinder in an assembled configuration of the fluid reservoir and the master cylinder and under a defined force applied to the fluid reservoir, and the at least one crash element bends out of the way under the defined force thereby allowing a depression of the fluid reservoir,
wherein the at least one crash element is spatially offset from the at least one connection fitting along a longitudinal axis of the master cylinder.

2. The assembly as claimed in claim 1, wherein the means of the fluid reservoir are configured to slide along a surface of the master cylinder under the defined force after the means are seated on the master cylinder.

3. The assembly as claimed in claim 1, wherein the means of the fluid reservoir are positioned in contact with the master cylinder at only a single location.

4. The assembly as claimed in claim 1, wherein the means of the fluid reservoir are positioned in contact and yet are disconnected from the master cylinder in the assembled configuration.

5. The assembly as claimed in claim 1, wherein the means of the fluid reservoir is separate from a connection point between the fluid reservoir and the master cylinder.

6. The assembly as claimed in claim 1, wherein the crash element breaks under the defined force applied to the fluid reservoir.

7. The assembly as claimed in claim 1, wherein the connection fitting is disposed at a first location on the fluid reservoir and is configured to be fluidly connected to the connection aperture of the master cylinder, and wherein the crash element is positioned at a second location on the fluid reservoir that is spaced from the first location.

8. The assembly as claimed in claim 1, wherein the master cylinder and the fluid reservoir are aligned along a common vertical axis and the crash element is misaligned with the common vertical axis.

9. An assembly comprising:
a fluid reservoir and a master cylinder for a motor vehicle hydraulic brake system,
wherein the fluid reservoir is configured to be fastened to the master cylinder by a releasable connection and comprising at least one connection fitting, which is received in a corresponding connection aperture of the master cylinder, and
at least one crash element connected to the fluid reservoir and spaced from the releasable connection, and wherein the at least one crash element is spatially offset from the at least one connection fitting along a longitudinal axis of the master cylinder,
wherein, in the event of a crash impact and under a defined force applied to the fluid reservoir, the crash element moves from a first position with respect to the master cylinder to a second position with respect to the master cylinder, and the at least one crash element bends out of the way under the defined force thereby allowing a depression of the fluid reservoir.

10. The assembly as claimed in claim 9, wherein the means are provided between a base of the fluid reservoir and the master cylinder.

11. The assembly as claimed in claim 10, wherein the means are formed onto the base of the fluid reservoir or are fastened to the base of the fluid reservoir.

12. The assembly as claimed in claim 11, wherein the means comprises at least one web that is formed onto the base of the fluid reservoir.

13. The assembly as claimed in claim 11, wherein the means comprises at least one cylindrical projection that is formed onto the base of the fluid reservoir.

* * * * *